United States Patent Office 3,047,399
Patented July 31, 1962

3,047,399
METHOD AND COMPOSITION FOR PRODUCING MEATY FLAVOR IN FOODS AND FOOD PRODUCTS
Wendell A. Landmann, Clarendon Hills, and Othmer F. Batzer, Chicago, Ill., assignors to Ray Brown, Frank J. Madden, James Seldon, A. W. Brickman, and John E. Thompson, all of Chicago, Ill., as trustees for the Benefit of American Meat Institute Foundation, Chicago, Ill., a non-profit corporation of Illinois
No Drawing. Filed Apr. 4, 1960, Ser. No. 19,505
13 Claims. (Cl. 99—110)

This invention relates generally to natural, cooked food flavors and more particularly to a method and composition for producing a meaty flavor in foods and food products. The invention especially emphasizes the odor aspects of natural, cooked meat flavor.

In one specific phase, the present invention relates to a multi-component, meat flavor precursor which is activated by heating in an appropriate medium.

Interest in the substances responsible for the flavor of cooked foods, especially in the substances responsible for the flavor of cooked meat, has been evident for some time; nonetheless, the approaches heretofore employed have not given rise to results of any substantial, practical significance. One frequently employed technique is devoted to capturing the highly fugitive flavor essence from cooking meat, and this aproach has met with only limited success because of a number of factors including the comparatively low concentrations in which the flavor essences are found and the instability of the mixture of substances which make up the essence.

Another commonly employed approach involves isolation and chemical identification of the flavor components followed by attempts at synthesizing the identified materials. The manifest difficulties of isolating the components of natural, cooked food flavor essences seriously complicates their identification; and even where one or more components have been identified and synthesized, the resulting, formulated essences have proved to be coarse and unnatural because they lack the numerous minor constituents which finish and round out the bouquet of the primary components, adding keynote aromas and overtones.

More recently, efforts have been devoted to extracting flavor precursors from foods prior to their processing in order to avoid subjecting the flavor precursors to the degradating effects of the preserving methods, the flavor precursors being added to the food subsequent to its processing. However, these efforts have not resulted in the development of true, freshly cooked food flavors, especially in the case of meats. Moreover, a satisfactory meat flavor precursor having demonstrated shelf-stability has not heretofore been produced.

The present invention is based on the discovery of a heat activatable, flavor precursor in the dialyzable portion of a water extract of raw, lean meat and the proceeding discovery that this dialyzable portion is further separable into shelf-stable components.

Accordingly, an important object of the present invention is to provide an improved method of producing a meaty flavor in foods and food products.

Another object of the invention is to provide a method of producing a full, natural, cooked meat flavor in foods and food products.

Yet another object of the invention is to provide a process for producing a novel, multi-component, meat flavor precursor.

Still another object of the invention is to provide a process for producing such a precursor, the components of which are shelf-stable.

A further object of the invention is to provide a process for producing a heat activatable, meat flavor precursor.

A still further object of the invention is to provide a novel composition for adding to food and food products in order to enhance the flavor thereof upon heating.

Additional objects and features of the invention pertain to the particular materials and methods whereby the above objects are attained.

In accordance with the procedures of the invention, raw meat is freed of all extraneous fat and ground coarsely. This starting material is preferably in its raw state and conveniently comprises scraps, trimmings and, under certain circumstances, the generally less marketable cuts. In addition, the flavor precursor of the invention has been found to be sufficiently water-soluble to eliminate the necessity of finely comminuting the starting material, as by using a Waring blendor. Therefore, only a comparatively coarse grinding is employed.

The ground, lean meat is added to suitably purified water at the rate of aproximately four pounds per gallon, and the resulting mixture is allowed to steep for about one hour at approximately 35° F. The solids are subsequently removed by double filtering and have separate utility, being employable in products where flavor is of less importance, as for example in highly spiced meat specialties and in animal food.

The water extract is dialyzed against water using conventional, cellulose dialysis tubing such as is commercially available from the Visking Company, Chicago, Illinois, a division of the Union Carbide Corporation. This first separation is conveniently achieved by filling the dialysis tubing with distilled water and revolving it in the extract for about 16 hours while the extract is maintained at a temperature of approximately 37° F.

The diffusate from this first dialysis contains the essential, flavor precursing components; but when the diffusate has been lyophilized without further separation the resulting material has proved highly unstable changing from a white granular powder to a dark tarry mass in as little as three days even in a dessicated atmosphere.

Accordingly, the diffusate from the first dialysis is further separated by a dialysis employing as dialysis tubing cellulose sausage casing manufactured by the Visking Company, supra. The material which diffuses through the cellulose sausage casing comprises such lower molecular weight compounds as sugars and amino acids whereas the material which is not diffused through the cellulose sausage casing is primarily protein in nature. It is believed that the pore size of the cellulose sausage casing is particularly well adapted to achieve this essential separation, the pore size of the cellulose sausage casing being somewhat smaller than that of the conventional, dialysis tubing.

The undiffused or retained fraction from the second dialysis step is subsequently separated by gel filtration employing the cross-linked dextran known commercially as Sephedex G–25. The procedure suggested by Porath and Flodin in Nature, 183, p. 1657 (1959), has been successfully employed in this regard. Gel filtration is of particular advantage in the invention since no adulterants or substances of possible reactivity with the precursor need be added.

The resulting filtrate, when de-watered, is a light tan material which gives a negative carbohydrate test. However, this material is proteinaceous in character, as evidenced by a positive ninhydrin test. This proteinaceous material produced by dialysis and gel filtration will be referred to hereinafter as "component A."

The lower molecular weight filtrant from the gel filtration, when de-watered, is a white, fluffy powder which is a mixture of carbohydrates, proteins, and high phosphorous compounds, as evidenced by the results of classical qualitative procedures. This material will be referred to hereinafter as "component B."

The diffusate from the second dialysis step is further separated, in accordance with the invention, by using a column of Dowex 50 having 200–400 meshes per inch and an 8X linkage. Such columns incorporate ion-exchange resin commercially produced by the Dow Chemical Company, Midland, Michigan. The effluent from this third separation is strongly positive for carbohydrates using either anthrone, triphenyltetrazolium chloride or aniline acetate tests. This effluent is, furthermore, ninhydrin negative; and when de-watered, gives a shelf-stable powder. This material will be referred to hereinafter as "component C."

The components of the flavor precursor of the invention are present in meat muscle in practical quantities; and when round of beef has been employed as the starting material, the following, typical yields have been obtained. The figures are given on a weight percentage basis.

TABLE I

| Component: | Yield, percent |
| --- | --- |
| A | 0.0005–0.001 |
| B | 0.001–0.002 |
| C | 0.2–0.3 |

Insofar as is presently known, these flavor precursing components have a demonstrated shelf-life of at least two months at ambient, room temperatures.

The meat flavor material of the invention, being a true precursor, requires activation in order to develop the exciting flavor of cooked meat; and moderate heating in an appropriate medium satisfactorily activates the precursor, temperatures on the order of 280–320° F. having been usefully employed in this regard. The flavor precursor of the invention, when dissolved in water without heating, has produced only a mildly salty taste and no detectable odor. While heating of the flavor precursor is essential to the evolution of its flavor, the character of the medium in which the precursor is heated also contributes to the ultimate flavor that develops. Mediums containing animal fat from a source corresponding with the source of the precursor result in a somewhat more natural flavor.

When heated with beef fat alone, component B produces an aroma characteristic of aged, roast beef which has been stored in a refrigerator for several days and then reheated. When heated with beef fat, a combination of small aliquots of each of components A, B and C results in a "broiled steak" odor, whereas when heated in distilled water, a characteristic beef bouillon odor is produced.

For purposes of affording a more complete understanding of the invention and of the manner in which it may be practiced, it is advantageous to provide at this juncture a number of detailed examples, as follows:

*Example 1*

1,000 grams of raw round of beef had extraneous fat removed and was ground coarsely to be extracted with water. The water extract was treated in accordance with the procedures of the invention to give beef components A, B and C.

These beef components A, B and C were combined in equal proportions by weight, and the combination was added to beef fat at a rate of two micrograms/gram of fat. This mixture, when heated to approximately 320° F., gave a pronounced odor of "broiled steak."

*Example 2*

Beef components A, B and C were combined in equal proportions by weight and dissolved in water, each component being present at a level of approximately 200 p.p.m. This solution was used to rehydrate a quantity of freeze-dried veal steaks which were then broiled for approximately twenty minutes. These rehydrated broiled veal steaks were compared with a correspondingly prepared control quantity of steaks which had been rehydrated with plain water. A taste panel was unanimous in expressing the belief that the steaks rehydrated in the water solution of beef components A, B and C possessed a superior flavor to the control steaks. Some individuals in the panel believed that a "beefy flavor" was present, whereas others stated that the veal flavor was "enhanced."

*Example 3*

Beef components A, B and C were combined in equal proportions by weight and added to mineral oil at a level of approximately 20 p.p.m. The mineral oil dispersion was heated to approximately 290° F. and held at this temperature for an extended period of time. A "broiled steak" odor persisted for approximately four hours but was not quite as natural as when a medium containing beef fat was utilized.

*Example 4*

1,000 grams of raw whole chicken muscle was coarsely ground and extracted with water. This water extract was treated in accordance with the procedures of the invention to give chicken components A, B and C.

These chicken components A, B and C were combined in equal proportions by weight and added to chicken fat at a rate of ten micrograms/gram of fat. This mixture, when heated to approximately 285° F., gave a "roast beef" odor with "definite overtones of roast chicken."

*Example 5*

1,000 grams of raw loin of pork had the extraneous fat removed and was ground coarsely to be extracted with water. This water extract was treated in accordance with the procedures of the invention to give pork components A, B and C.

These pork components A, B and C were combined in equal proportions by weight and added to pork fat at a rate of three micrograms/gram of fat. This mixture, when heated to 315° F., gave an odor substantially that of "roast beef with hints of roast pork."

It will become apparent that the flavor precursor of the invention may be employed in a number of advantageous ways. For example, it may be used to up-grade certain cuts of meat by enhancing flavor. Prime beef, in particular, is tender, esculent and possessed of a desirable texture; however, it is undesirably bland to many palates. The present flavor precursor is intended to be used by home and commercial chefs alike to enhance the flavor of such otherwise superior cuts of beef by bringing the presursor into contact therewith prior to or during cooking.

The flavor precursor of the invention also can be used to develop a meaty flavor in products whose natural flavor is of low level or has been substantially destroyed. For instance, the present flavor precursor may be used to advantage in developing a meaty flavor in irradiated meats. Furthermore, the meat precursor of the invention can be added to sausage and other like products to achieve a superior balance between the spice flavors and the meat flavor. Moreover, it is expected that the present flavor material will also find uses in soup mixes, spaghetti sauces and other food specialties.

It is to be understood that the flavor precursor of the invention is intended to be kept stored as the separate components until shortly before actual use is expected. However, it is anticipated that sufficient separation of the components will be achieved by their dispersal in dry, powdered, inert ingredients.

The specific methods and examples herein described are to be considered as being primarily illustrative. Various changes will, no doubt, occur to those skilled in the art of food flavoring; and these departures are to be understood as forming a part of this invention insofar as they fall within the spirit and scope of the appended claims.

The invention is claimed as follows:

1. A method of producing a meaty flavor in foods and food products, which method is characterized by the steps of: bringing selected, flavor-precursing fractions of a relatively cold water extract of lean meat into contact with an edible medium; and heating said medium to react said fractions and generate said meaty flavor.

2. A method of producing a meaty flavor in foods and food products, which method is characterized by the steps of: extracting raw, lean meat with relatively cold water; separating said extract into a plurality of shelf-stable, flavor-precursing fractions; de-watering said fractions; bringing selected fractions into contact with an edible medium; and heating said medium to react said fractions and generate said meaty flavor.

3. A method in accordance with claim 1 wherein said meat is raw beef.

4. A method in accordance with claim 1 wherein said meat is raw pork.

5. A method in accordance with claim 1 wherein said meat is raw fowl.

6. A method in accordance with claim 1 wherein said edible medium contains an animal fat.

7. A process for producing a multi-component, meat flavor precursor, which process is characterized by the steps of: preparing a relatively cold water extract of raw, lean meat; dialyzing said water extract to obtain a first diffusate; dialyzing said diffusate to obtain a second diffusate and a retained fraction; separating said retained fraction by gel filtration into a filtrant and a higher molecular weight filtrate; separating said second diffusate to obtain an effluent and individually drying said filtrate, said filtrant and said effluent to obtain the components of said precursor.

8. A process for producing a multi-component, meat flavor percursor, which process is characterized by the steps of: preparing a relatively cold water extract of raw, lean meat; dialyzing said water extract using cellulose dialysis tubing to obtain a first diffusate; dialyzing said diffusate using sausage casing dialysis tubing to obtain a second diffusate and a retained fraction; separating said retained fraction by gel filtration using cross-linked dextran into a filtrant and a higher molecular weight filtrate; separating said second diffusate using a column of ion-exchange resin to obtain an effluent and individually drying said filtrate, said filtrant and said effluent to obtain the components of said precursor.

9. A process in accordance with claim 7 wherein said meat is beef.

10. A process in accordance with claim 7 wherein said meat is pork.

11. A process in accordance with claim 7 wherein said meat is fowl.

12. A composition for adding to foods and food products to enhance the flavor thereof upon heating, said composition comprising: a mixture of carbohydrates, proteins and high phosphorus compounds recovered from a relatively cold water extract of raw, lean meat by repeated molecular size separations.

13. A shelf-stable composition for adding to folds and food products to enhance the flavor thereof upon heating, said composition comprising: a proteinaceous material recovered from a relatively cold water extract of raw, lean meat by repeated, molecular size separations; a mixture of carbohydrates, proteins and high phosphorus compounds recovered from said water extract by repeated, molecular size separations; and a carbohydrate material separated from said extract by repeated, molecular size separations, said proteinaceous material, said mixture and said carbohydrate material being held separate from each other until shortly before use thereof in enhancing flavor.

References Cited in the file of this patent

UNITED STATES PATENTS

| | | |
|---|---|---|
| 431,730 | Ruymbeke | July 8, 1890 |
| 2,009,391 | Darling | July 30, 1935 |
| 2,421,376 | Erickson et al. | June 3, 1947 |

OTHER REFERENCES

"Comparison of the Effectiveness of Selected Ion-Exchange Resins for the Purification of Clarified Sugar Cane Juice," by Fort et al., Sugar Cane Products Division, Southern Regional Research Laboratory, New Orleans, Louisiana, page 179.